May 8, 1945.　　　W. M. LIPPS　　　2,375,566
ROTOR DISK FOR BRAKES
Filed Dec. 13, 1943　　　2 Sheets-Sheet 1
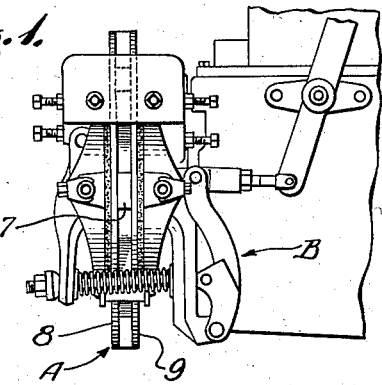
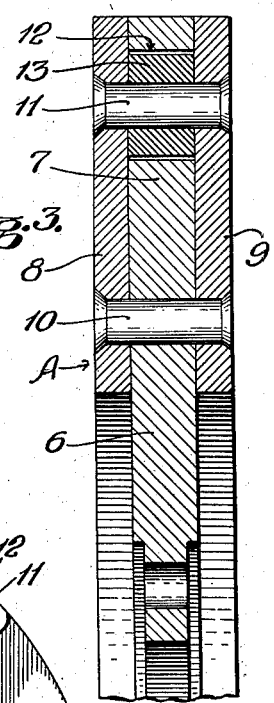
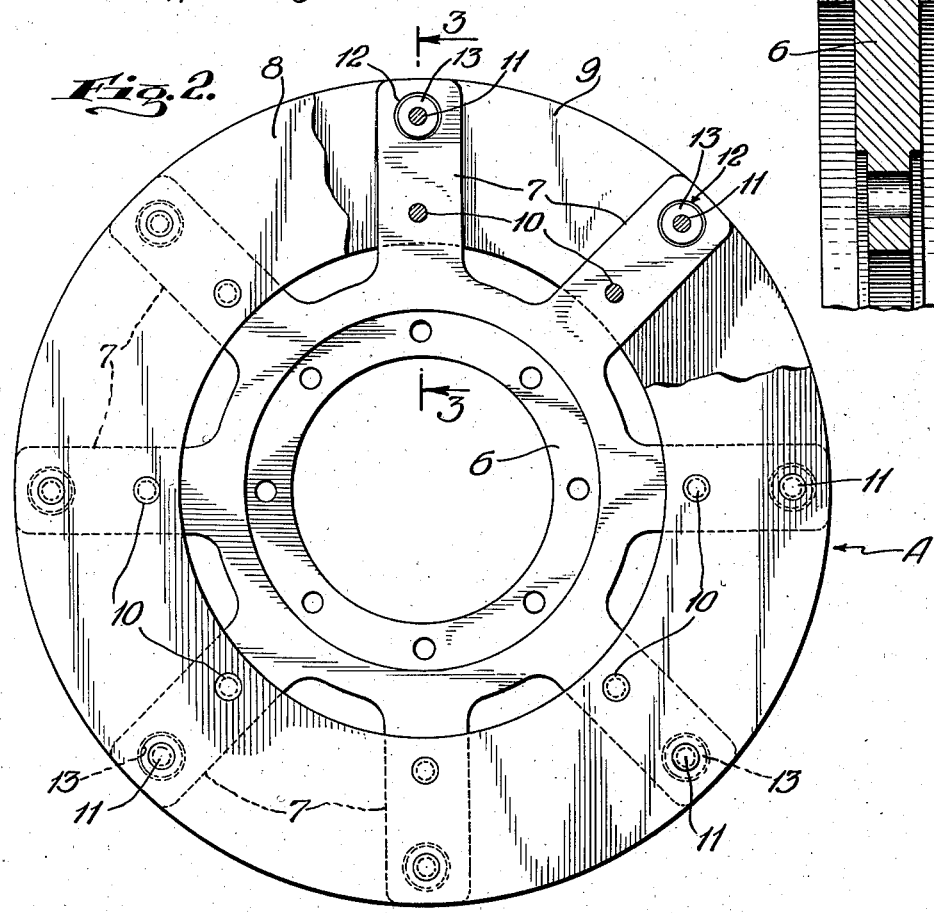
INVENTOR
WALTER M. LIPPS
BY
ATTORNEY May 8, 1945.  W. M. LIPPS  2,375,566
ROTOR DISK FOR BRAKES
Filed Dec. 13, 1943  2 Sheets-Sheet 2
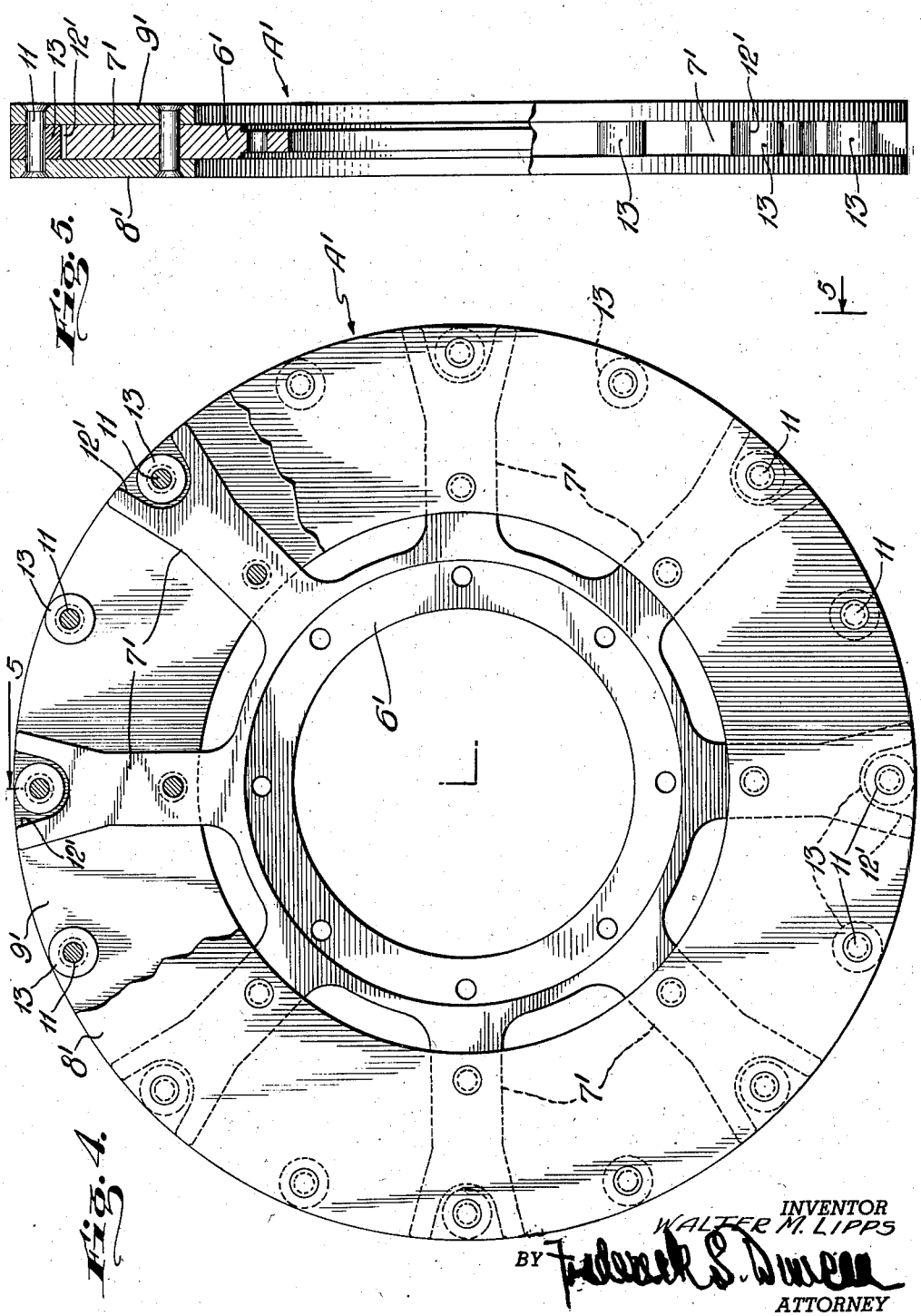
INVENTOR
WALTER M. LIPPS
BY
ATTORNEY Patented May 8, 1945

2,375,566

UNITED STATES PATENT OFFICE 2,375,566

ROTOR DISK FOR BRAKES

Walter M. Lipps, Birmingham, Mich., assignor to American Chain & Cable Company, Inc., Bridgeport, Conn., a corporation of New York Application December 13, 1943, Serial No. 514,131

6 Claims. (Cl. 188—218)

This invention relates to improvements in rotor disks for brakes, more particularly rotor disks of the ventilated type.

In stopping a truck within the legal stopping distance, the rotor disk, more particularly the annular facing plates of the rotor disk, may be heated from out-door temperature to approximately 1300° F. in six seconds. This causes considerable radial expansion of the annular facing plates of the rotor disk, and when cooling, causes contraction. This radial expansion of the annular facing plates may cause them to warp or buckle in constructions in which their outer sections are rigidly and immovably secured to a supporting spider or the like.

The main object of this invention is an improvement in rotor disks to prevent warping or buckling of their annular facing plates.

More specifically, an object of this invention is an improved rotor disk including a supporting spider and annular facing plates secured against the side faces of the legs of the spider, in which the annular facing plates are secured at points near their inner and outer edges against the side faces of the legs of the spider and in which provision is made to permit the outer sections of the annular facing plates to move radially outwardly with respect to the legs of the spider upon radial expansion due to heat developed by a braking operation.

More specifically, an object of this invention is to provide floating rivets or the like for securing the outer sections of the annular facing plates against the side faces of the legs of the spider so as to permit radial outward expansion of the annular facing plates with respect to the legs of the spider and prevent distortion of the annular facing plates when they are suddenly heated by braking action to high temperature which in the operation of braking is usually considerably higher than that of the legs of the spider.

Another object of this invention is to provide a construction in which the outer row of rivets may be located very close to the outer edges of the annular facing plates.

Other objects of this invention will appear from the following description taken in connection with the drawings, in which:

Fig. 1 is a side view of a brake including my improved rotor disk, this figure also showing brake shoes and their operating means;

Fig. 2 is a side view of one form of my improved rotor disk with parts broken away to show the outer rivet connection;

Fig. 3 is a transverse section on line 3—3 of Fig. 2;

Fig. 4 is a side view of another form of my improved rotor disk with parts broken away to show the outer rivet connection; and Fig. 5 is a transverse section on line 5—5 of Fig. 4.

For purposes of disclosure I have illustrated in Fig. 1 a brake mechanism on an automobile or truck, but it is to be understood that the brake mechanism including my improved rotor disk may be used on any other vehicle or on a shaft of a machine or the like.

In Figs. 1, 2 and 3 there is shown a brake mechanism which includes one of my improved forms of rotor discs designated by the letter A. Shown cooperating with the outer faces of the annular facing plates of the rotor disc are brake shoes which may be operated by any suitable mechanism indicated generally by the letter B, the construction disclosed being that shown in the patent to Williams 1,978,974, dated October 30, 1934.

The rotor disc A is of a composite construction of the ventilated type disclosed in the patent to Williams et al. 1,995,135, dated March 19, 1935, and includes a spider 6 (Figs. 2 and 3) which consists of an inner annular member provided with rivet or bolt holes by means of which the spider may be secured to a rotatable shaft such as an engine or transmission shaft not disclosed. The spider is provided with a series of circumferentially spaced radially and outwardly extending legs 7 against the side faces of which are secured annular facing plates 8 and 9 which are of identical construction and with which the brake shoes cooperate to produce the braking action. The spider and the annular facing plates may be made of malleable iron. As disclosed, the faces on the outer ends of the legs of the spider are alined transversely with the faces on the outer edges of the annular facing plates 8 and 9.

In the construction disclosed in Figs. 1, 2 and 3 the annular facing plates 8 and 9 are secured near their inner edges against the side faces of the legs 7 of the spider 6 by a circular series of rivets 10 extending through the annular facing plates and the legs 7 of the spider near their inner ends and fitting tightly in the rivet holes in the annular facing plates and legs of the spider. In constructions of this general type it is desirable, of course, to secure the outer sections of the annular facing plates against the side faces of the legs of the spider to obtain proper support for these plates. In accordance with the invention disclosed in Figs. 1, 2 and 3, I provide another circular series of rivets 11 which connect the annular facing plates 8 and 9 together near their outer edges and hold them in tight contact with the side faces of the legs 7 of the spider 6. I provide play between these rivets and the edges of the holes in the legs of the spider through which they pass, and I accomplish this by providing the outer ends of the legs of the spider with relatively large holes, as indicated at 12, made considerably larger than the rivets in order that I may employ spacing bushings 13 through which the rivets 11 extend, which bushings are provided to support the rivets and prevent them from bending during the riveting operation. In this construction clearance is provided between the bushings 13 and the walls of the holes 12 so that the bushings may move outwardly with the outer sections of the annular facing plates during expansion due to heat developed during the braking action.

In the second form of the invention disclosed in Figs. 4 and 5, the rotor disk A' includes a spider 6', the legs of which are indicated at 7'. The annular facing plates are indicated at 8' and 9'. These plates are of the same construction as those disclosed in Figs. 1, 2 and 3 except that the outer circular series of rivet holes is located closer to the outer edges of the annular facing plates and includes additional rivet holes for purposes to be described.

In this embodiment the outer ends of the legs 7' of the spider 6' are recessed as indicated at 12' for the reception of the spacing bushings 13 and rivets 14. This makes it possible to locate the bushings 13 and rivets 14 much closer to the outer edges of the annular facing plates 8' and 9' than in the construction disclosed in Figs. 1, 2 and 3, which, of course, is desirable in a fabricated construction of this character.

As disclosed in Fig. 4, I also may provide bushings 13 and rivets 14 intermediate of the legs 7' of the spider 6' to support the annular facing plates 8' and 9' at these points, so as to prevent the same from distorting and buckling in the regions between the legs of the spider.

While I have disclosed two embodiments of my invention which I now regard as preferred forms, it is to be understood that this has been done merely for the purpose of disclosing the invention and that I reserve the right to all such changes as fall within the principles of this invention and the scope of the accompanying claims.

I claim:

1. A rotor brake disk comprising a supporting member and an annular facing plate located against one side of said supporting member, a series of securing means securing said facing plate near its inner edge against the side face of said supporting member, and an outer series of securing means also securing said plate near its outer edge against the side face of said supporting member and providing for relative radial movement between the outer edge of the facing plate and the supporting member.

2. A rotor brake disk comprising a supporting spider provided with a plurality of radially outwardly extending legs, a pair of annular facing plates in contact with the outside faces of said legs, an inner series of rivets connecting said plates near their inner edges against the side faces of the legs of the spider, and an outer series of rivets connecting said annular plates near their outer edges against the side faces of the legs of the spider, all of said rivets of both of said series passing through holes in the plates and in the legs of said spider and the holes in the legs of the spider through which the rivets of the outer series pass being of greater dimension radially than the rivets.

3. A rotor brake disk comprising a spider provided with a plurality of radially outwardly extending legs, a pair of annular facing plates secured against the side faces of the legs of the spider by securing means comprising an inner series of rivets passing through said plates and legs and an outer series of rivets passing through said plates and legs, and spacing bushings on the rivets of the outer series located in openings in the legs of the spider of greater diameters than the diameters of the bushings.

4. In a rotor brake disk, the combination of a supporting spider provided with radially outwardly extending legs the outer ends of which are provided with recesses opening radially outwardly, a pair of annular facing plates located against the sides of said legs, means rigidly securing the inner regions of said plates to said legs and a series of rivets connecting the outer regions of said plates and holding them against the side faces of said legs, said rivets being freely received within the recesses in the ends of said legs.

5. In a rotor brake disk, the combination of a supporting spider provided with radially outwardly extending legs the outer ends of which are provided with recesses opening radially outwardly, a pair of annular facing plates located against the sides of said legs, an inner series of rivets rigidly securing said plates to said legs and an outer series of rivets connecting the said plates and holding them against the side faces of said legs, and a series of spacing bushings through which said outer rivets pass and against which said plates are secured, said bushings being freely received in the recesses in the outer ends of the legs of the spider.

6. In a rotor brake disk the combination of a supporting spider provided with radially outwardly extending legs the outer ends of which are provided with recesses opening radially outwardly, a pair of annular facing plates located against the sides of said legs, an inner series of rivets rigidly securing said plates to said legs and an outer series of rivets connecting said plates and holding them against the side faces of said legs, a series of spacing bushings through which said outer rivets pass and against which said plates are secured, said bushings being freely received in the recesses in the outer ends of the legs of the spider, and other outer rivets, arranged alternately with the rivets of said outer series connecting said side plates, and spacing bushings through which said rivets pass and against which said side plates are secured by said other rivets.

WALTER M. LIPPS.